UNITED STATES PATENT OFFICE.

HERBERT LEVINSTEIN AND MAX WYLER, OF BLACKLEY, MANCHESTER, ENGLAND, ASSIGNORS TO LEVINSTEIN LIMITED, OF BLACKLEY, MANCHESTER, ENGLAND, A LIMITED LIABILITY COMPANY.

MANUFACTURE OF AZO DYESTUFFS.

1,024,794.     Specification of Letters Patent.     Patented Apr. 30, 1912.

No Drawing.     Application filed October 18, 1910. Serial No. 587,700.

*To all whom it may concern:*

Be it known that we, HERBERT LEVINSTEIN, M. Sc., Ph. D., a subject of the King of Great Britain and Ireland, and MAX WYLER, Ph. D., a citizen of the Swiss Republic, both resident in Blackley, Manchester, in the county of Lancaster, England, have invented new and useful Improvements in the Manufacture of Azo Dyestuffs, of which the following is a specification.

This invention relates to new monoazo dyestuffs dyeing cotton directly without a mordant of the following general formula

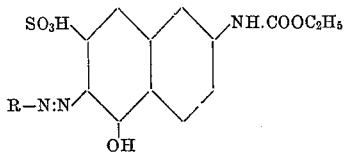

where R represents a substituted or unsubstituted benzene or naphthalene ring.

The new dyestuffs are produced by combining a diazo compound with the urethane of 2.5-amidonaphthol-7-sulfonic acid of the following formula

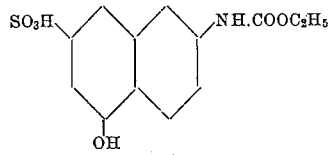

The following is an example of how this invention may be carried into effect: 14.3 parts of beta naphthylamin are diazotized by means of 30 parts of 30% hydrochloric acid and 6.9 parts of nitrite of soda in the usual manner. The diazo solution is then poured into a solution containing 32.6 parts of the urethane of 2-amino-5-naphthol-7-sulfonic acid and 20 parts of sodium carbonate. After stirring for 6 hours the mass is heated to 70° C. and the dyestuff is thrown out of solution with the addition of salt, filtered, pressed and dried. After grinding the new dyestuff is obtained as a brownish red powder possessing an excellent affinity for cotton, and which dyes unmordanted cotton direct in scarlet shades of good fastness to light and fast to dilute alkalis and mineral acids. It dissolves in water to a yellow-red solution from which a red flocculent precipitate separates out on the addition of sodium carbonate. The powder dissolves in concentrated sulfuric acid to a bright violet solution from which a red flocculent precipitate separates out on the addition of water.

Other suitable diazo compounds than that obtained from beta naphthylamin in the above example may be used, as, for example those tabulated below:—

| Amin. | Color of powder. | Appearance of aqueous solution. | Aqueous solution on addition of sodium carbonate. | Solution in concentrated sulfuric acid. | Addition of water to concentrated sulfuric acid solution. | Dyeing on cotton. |
|---|---|---|---|---|---|---|
| Paraxylidin | Brick red | Yellow red | Yellow red; flocculent precipitate. | Blue red | Brick red; flocculent precipitate. | Yellow red. |
| Alpha naphthylamin | Dark green | Blue red | Blue red; flocculent precipitate. | Bright blue | Red; flocculent precipitate. | Blue red. |
| Paramidoacetanilid | Dark red | Cherry red | Unchanged | Bright red | Brown; flocculent precipitate. | Scarlet. |
| Benzoylparaphenylenediamin. | Dark red | Cherry red | Red; flocculent precipitate. | Blue red | Red brown; flocculent precipitate. | Red. |

What we claim as our invention is:

1. The process of producing monoazo dyestuffs of the general formula

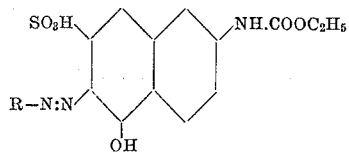

where "R" represents an aromatic substituent by combining a diazo compound with the urethane of 2.5-amidonaphthol-7-sulfonic acid, substantially as herein before described.

2. New monoazo dyestuffs having the general formula

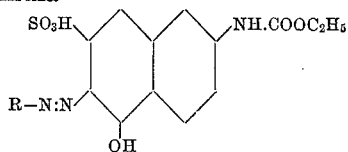

where "R" represents an aromatic substituent.

In witness whereof we have hereunto set our hands in the presence of two subscribing witnesses.

HERBERT LEVINSTEIN.
MAX WYLER.

Witnesses:
JOHN O'CONNELL,
ROGER B. KNOTT.

---

Copies of this patent may be obtained for five cents each, by addressing the "Commissioner of Patents, Washington, D. C."